US012041138B1

(12) United States Patent
Mahajan et al.

(10) Patent No.: US 12,041,138 B1
(45) Date of Patent: Jul. 16, 2024

(54) COMPUTER-IMPLEMENTED METHODS FOR SYNTHETIC ACCURACY MEASUREMENT OF A CONTENT RECOGNITION SYSTEM

(71) Applicant: Amazon Technologies, Inc., Seattle, WA (US)

(72) Inventors: Nagaraj Mahajan, Allston, MA (US); David McGuire, Brentwood, NH (US); Zhengping Jin, Waltham, MA (US); Ahmed Abdelal, North Andover, MA (US)

(73) Assignee: Amazon Technologies, Inc., Seattle, WA (US)

(*) Notice: Subject to any disclaimer, the term of this patent is extended or adjusted under 35 U.S.C. 154(b) by 102 days.

(21) Appl. No.: 17/954,005

(22) Filed: Sep. 27, 2022

(51) Int. Cl.
*G06F 16/00* (2019.01)
*G06F 16/43* (2019.01)
*H04L 67/51* (2022.01)

(52) U.S. Cl.
CPC .............. *H04L 67/51* (2022.05); *G06F 16/43* (2019.01)

(58) Field of Classification Search
CPC ....................................................... G06F 16/43
See application file for complete search history.

(56) References Cited

U.S. PATENT DOCUMENTS

2019/0362129 A1* 11/2019 Sandhan ............ G06V 40/1335

OTHER PUBLICATIONS

Haitsma et al., "A Highly Robust Audio Fingerprinting System", 3rd International Conference on Music Information Retrieval (ISMIR 2002), Oct. 2002, 9 pages.

* cited by examiner

Primary Examiner — Ajith Jacob
(74) Attorney, Agent, or Firm — NICHOLSON DE VOS WEBSTER & ELLIOTT LLP

(57) ABSTRACT

Techniques for synthetic accuracy measurement of a content recognition system are described. According to some examples, a computer-implemented method includes generating, by a provider network, a reference fingerprint for a secondary content (e.g., advertisement) media file; generating, by the provider network, a synthetic fingerprint for a transformed version of the secondary content media file; inserting, by the provider network, the synthetic fingerprint into a stream of fingerprints of a plurality of media files; comparing, by a comparison service of the provider network, the stream of fingerprints including the synthetic fingerprint to the reference fingerprint to generate an indication of a match between the synthetic fingerprint and the reference fingerprint in the stream; and sending the indication of the match to a storage location.

20 Claims, 12 Drawing Sheets

228

| Field | Description | Specific additional requirement for test streams |
|---|---|---|
| stream_id | Unique identification (ID) of the stream and/or fingerprint sent for matching | This would be set to NULL for real fingerprints by default, for example,<br><br>For synthetic fingerprints from the reference database (DB), it would be set to the reference content (e.g., advertisement) ID, for example.<br><br>For synthetic fingerprints not from the reference DB, it would be set to NONE, for example. |
| label | To identify the reference content (e.g., advertisement) from which the synthetic fingerprint was generated | |
| is_strong_match | Boolean variable that signals if the fingerprint matched to reference content (e.g., advertisement) in the reference DB | |
| stream_best_match_ad_id | Unique ID of the reference content (e.g., advertisement) that the stream matched to | |
| stream_customer_id | Customer ID for the stream | N/A |
| stream_dsn | Device serial number (DSN) of the device generating the on-device fingerprint | All the fingerprints from the same content (e.g., advertisement) should have the same DSN, for example. |
| stream_received_timestamp | Timestamp of when the fingerprint was generated | |
| locale | The locale from which the stream was generated | N/A |
| region | Region of the stream | N/A |
| namespace | Namespace of the device | N/A |
| date_utc | Date in UTC of when the fingerprint is generated | |
| best_match_delta_from_threshold | Difference between the best matching score and threshold | |
| best_matching_score | Best matching score (e.g., bit error rate) for the fingerprint stream | |
| best_match_overlap_msec | Amount of overlap between test and reference fingerprint (e.g., should ideally be the length of the fingerprint chunk) | |
| best_match_offset_msec | Amount of shift for the test fingerprint | |

*FIG. 6*

COMPUTER-IMPLEMENTED METHODS FOR SYNTHETIC ACCURACY MEASUREMENT OF A CONTENT RECOGNITION SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 6 is an example format of exposure data according to some examples.

DETAILED DESCRIPTION

Figure 1:
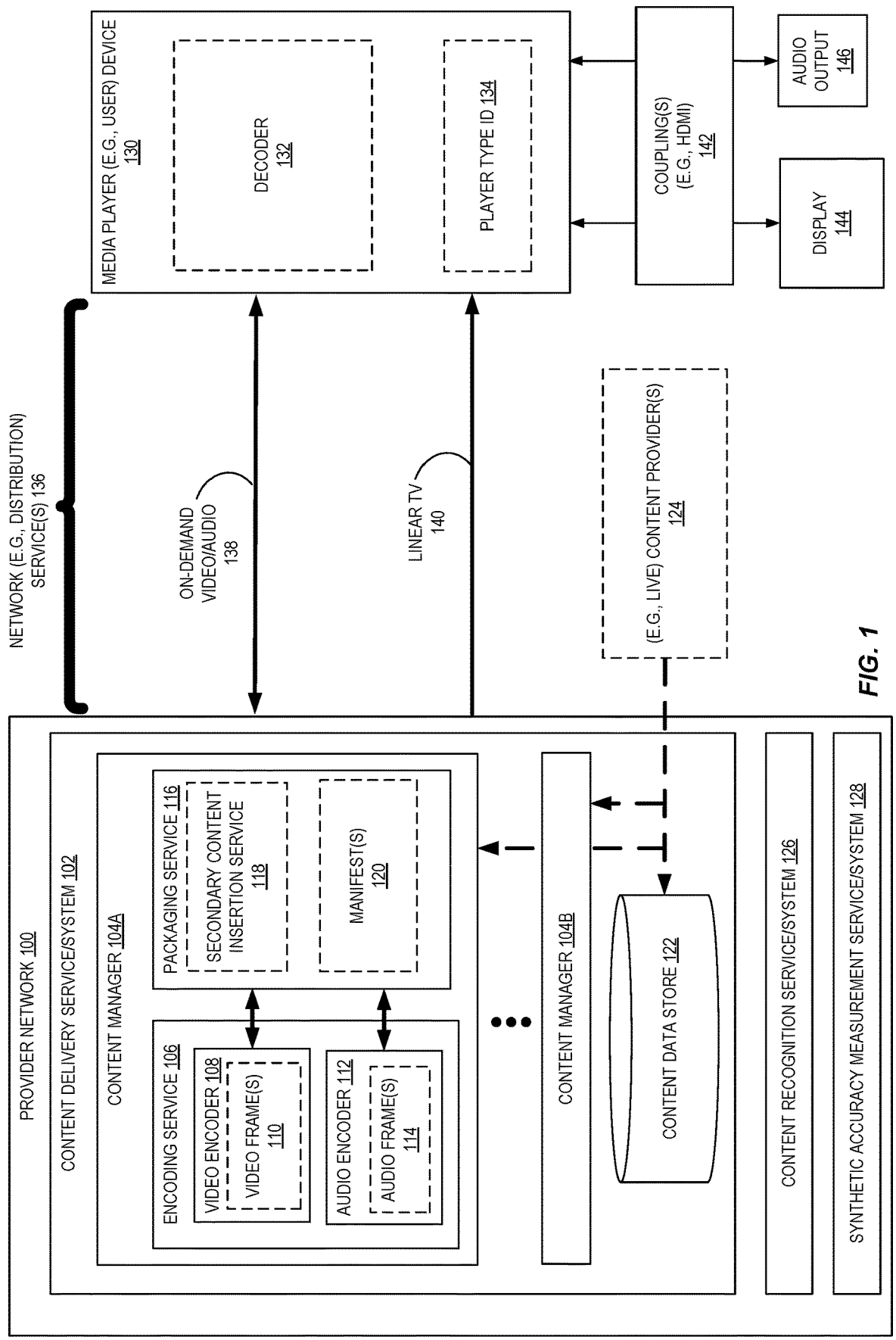
FIG. 1 is a diagram illustrating an environment including a provider network, coupled to a media player device, having a content delivery service/system, content recognition service/system, and synthetic accuracy measurement service/system according to some examples.

The present disclosure relates to methods, apparatus, systems, and non-transitory computer-readable storage media for synthetic accuracy measurement of a content recognition system. Certain examples herein are directed to a computer-implemented service and/or device (e.g., cloud device) (e.g., non-transitory computer-readable medium stored on the device) that generates and uses synthetic temporal and/or spectral feature(s) (e.g., synthetic fingerprint(s)) generated for a particular media (e.g., a particular video and/or audio) to measure (e.g., evaluate) the performance of a content recognition service/system. Certain examples herein compare the synthetic temporal and/or spectral feature(s) (e.g., synthetic fingerprint(s)) generated for a particular media to reference (e.g., clean and/or source) temporal and/or spectral feature(s) (e.g., reference fingerprint(s)) generated for that particular media (e.g., the particular video and/or audio).

In certain examples, a temporal and/or spectral feature generator receives an input of a media file (e.g., video and/or audio) and generates a corresponding set of one or more temporal and/or spectral features based on that media file, e.g., that are used to (e.g., uniquely) identify the media file from other media file(s). In certain examples, a temporal and/or spectral feature generator identifies, extracts, and/or summarizes characteristic components of the media (e.g., video and/or audio), e.g., such that those components are used to (e.g., uniquely) identify the media file from other media file(s). In certain examples, temporal features (e.g., time domain features), include one or more of the energy of the signal, zero crossing rate, maximum amplitude, minimum energy, etc. In certain examples, spectral features (e.g., frequency based features) (e.g., obtained by converting the time based signal into the frequency domain using the Fourier transform, etc.) include one or more of: fundamental frequency, frequency components, spectral centroid, spectral flux, spectral density, spectral roll-off, etc. In certain examples, the generation of the set of one or more temporal and/or spectral features is without inserting identifying features (e.g., "watermarks") into the media (e.g., content) and therefore changing the media (e.g., content).

In certain examples, the set of one or more temporal and/or spectral features are a set of one of more fingerprints. In certain examples, a fingerprint is a short summary of media (e.g., video and/or audio). In certain examples, a video fingerprint is a shortened summary of a video object. For example, where a fingerprint function (e.g., fingerprint extraction algorithm) maps a video object (e.g., having a first number of bits) to a video fingerprint (e.g., having a smaller number of bits). In certain examples, an audio fingerprint is a shortened summary of an audio object. For example, where a fingerprint function (e.g., fingerprint extraction algorithm) maps an audio object (e.g., having a first number of bits) to an audio fingerprint (e.g., having a smaller number of bits). In certain examples, fingerprint extraction extracts (e.g., 32-bit) sub-fingerprints for every interval (e.g., of 11.6 milliseconds). In certain examples, a fingerprint block consists of (e.g., 256) subsequent sub-fingerprints, e.g., corresponding to a granularity of a given number of (e.g., only 3) seconds.

In certain examples, the temporal and/or spectral feature(s) (e.g., fingerprint(s)) for candidate media that is to-be-searched-for is compared (e.g., by a comparison algorithm) to a data store of reference temporal and/or spectral feature(s) (e.g., reference fingerprint(s)) of media to determine a match (e.g., if any), e.g., instead of the more compute intensive and data intensive comparison of the entire actual candidate media (e.g., multimedia object) to the entire reference media (e.g., multimedia objects).

In certain examples, the reference temporal and/or spectral feature(s) (e.g., reference fingerprint(s)) are generated based on a certain (e.g., clean) (e.g., untransformed) version of media (e.g., video and/or audio), but the candidate temporal and/or spectral feature(s) (e.g., candidate fingerprint(s)) are generated based on a different (e.g., dirty) (e.g., transformed) version of the same media (e.g., video and/or audio) (e.g., this different version as received and/or generated by a device external to the provider network), e.g., and the fingerprints are thus different in some respects. In certain examples, this difference causes issues (e.g., false positives, false negatives, etc.) with the performance of the comparison algorithm.

In certain examples, it is desirable to check the performance of the comparison algorithm (e.g., comparison service used in a content recognition service/system). In certain examples, this is achieved by inserting known temporal and/or spectral feature(s) (e.g., known fingerprint(s)) into a stream of other temporal and/or spectral feature(s) (e.g., other fingerprint(s)) and checking the performance, e.g., via metrics for the comparison algorithm correctly and/or incorrectly detecting a match for the known temporal and/or spectral feature(s) (e.g., known fingerprint(s)).

Examples herein are directed to the generation and use of (e.g., candidate) temporal and/or spectral feature(s) (e.g., candidate fingerprint(s)) that are generated based on the different (e.g., dirty) (e.g., transformed) version of media (e.g., video and/or audio) (e.g., this different version that would be received and/or generated by a device external to the provider network).

Instead of such (e.g., transformed) temporal and/or spectral feature(s) (e.g., candidate fingerprint(s)) for (e.g., candidate) media generated by a separate (e.g., user) device, certain examples herein are generated by a provider network, e.g., by a synthetic accuracy measurement service/system that generates "synthetic" temporal and/or spectral feature(s) (e.g., synthetic fingerprint(s)).

In certain examples, these synthetic temporal and/or spectral feature(s) (e.g., synthetic fingerprint(s)) are utilized by the provider network to perform an accuracy measurement of a comparison algorithm (e.g., of a content recognition service/system).

Examples herein improve the functioning of a computer-implemented method and a provider network by generating synthetic temporal and/or spectral feature(s) (e.g., synthetic fingerprint(s)), e.g., that are used to measure (e.g., and thus trigger modification) of a comparison (e.g., matching) algorithm. In certain examples, the comparison (e.g., matching) algorithm is used to determine if secondary content (e.g., an advertisement) is being shown (e.g., or not shown) (e.g., or shown multiple times) to a particular end user (e.g., user device).

Certain examples herein are directed to a synthetic accuracy measurement service system for measuring the performance of a content recognition system (e.g., in the absence of audio/video content) using fingerprinting. In certain examples, the content recognition service/system is in a provider network separate from a media (e.g., linear television) player device (e.g., viewer and/or listener of the media) and the provider network (e.g., content recognition service/system) is sent temporal and/or spectral feature(s) (e.g., fingerprint(s)) based on the media file but not the media file (e.g., or any manifest (e.g., manifest 120 in FIG. 1) that identifies the media file) itself. In certain examples, the provider network (e.g., content recognition service/system) uses fingerprints generated from synthetic content to monitor its performance, e.g., such that the synthetic fingerprints are generated continuously or on-demand. Example generation of synthetic fingerprints is discussed further herein.

FIG. 1 is a diagram illustrating an environment including a provider network 100, coupled to a media player (e.g., user) device 130, having a content delivery service/system 102, content recognition service/system 126, and synthetic accuracy measurement service/system ("SAMS) 128 according to some examples.

In certain examples, the provider network 100 (e.g., cloud provider) is coupled to the media player device 130 via network (e.g., distribution) service(s). In certain examples, media player (e.g., client) device 130 is to play one or more feeds (e.g., live streams), for example, on-demand video/audio 138 and/or linear television (TV) 140 (e.g., that can be viewed according to a set schedule, e.g., not on demand), e.g., sent via network (e.g., distribution) services 136. In certain examples, media player 130 includes a decoder 132 to decode video for viewing on display 144 and/or audio for outputting on audio output (e.g., speaker) 146. In certain examples, media player device 130 includes a coupling 142 (e.g., according to a standard, such as, but not limited to, a High-Definition Multimedia Interface (HDMI) standard) to display 144 and/or audio output 146. In certain examples, media player device 130 includes a player type identification (ID) 134, e.g., to uniquely identify the media player device 130.

In certain examples, a content provider 124 is to send content to a content data store 122 (e.g., which may be implemented in one or more data centers) and/or content manager(s) 104A to 104B (e.g., a single content manager or multiple content managers). In certain examples, a content provider 124 is on site to capture video (e.g., and audio) of a live event. In certain examples, content provider 124 is to encode the resulting output and send that encoded content to one or more downstream entities (e.g., content delivery service/system 102, e.g., via one or more networks.

As one example, a media file (e.g., including a video file and audio file) (e.g., a media container) that is to be encoded is accessed from the content data store 122 by one or more content managers 104A-104B. In certain examples, the media file may be uploaded to content data store 122 by content provider(s) or provided directly (e.g., as live content) to one or more content managers 104A-104B by content provider(s) (e.g., from a live content encoder).

In certain examples, the content manager (e.g., described in reference to content manager 104A, but one or more other content managers may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 106 is to encode the media file (e.g., video file and corresponding audio file) into one or more sets of video and audio representations (e.g., streams). In FIG. 1, video encoder 108 is to receive an input of a video file and create video frame(s) 110 from that video file, e.g., for a video frame and/or fragment duration. In FIG. 1, audio encoder 112 is to receive an input of an audio file and create audio frame(s) 114 (e.g., a number of audio samples within each frame) for that audio file, e.g., at an audio frame and/or fragment duration. In certain examples, packaging service 116 is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 106 may include a plurality of instances of video encoder 108 and audio encoder 112, e.g., to process multiple inputs in parallel. In certain examples, secondary content insertion service 118 adds secondary content (e.g., advertisement(s)) into a main content. In certain examples, encoding service 106 is to encode both the main content and secondary content, e.g., and the secondary content insertion service 122 is to insert the secondary content into the main content.

In certain examples, synthetic accuracy measurement service/system 128 is to generate temporal/spectral feature(s) (e.g., fingerprint(s)) for media, e.g., as discussed further below.

In certain examples, a content recognition service/system 126 is included to identify content displayed and/or audibly played to an end user (e.g., via media player device 130). In certain examples, media player device 130 is to display a video on display 144 and/or output audio on audio output 146. In certain examples, the media is sent from a different source than provider network 100.

Figure 2:
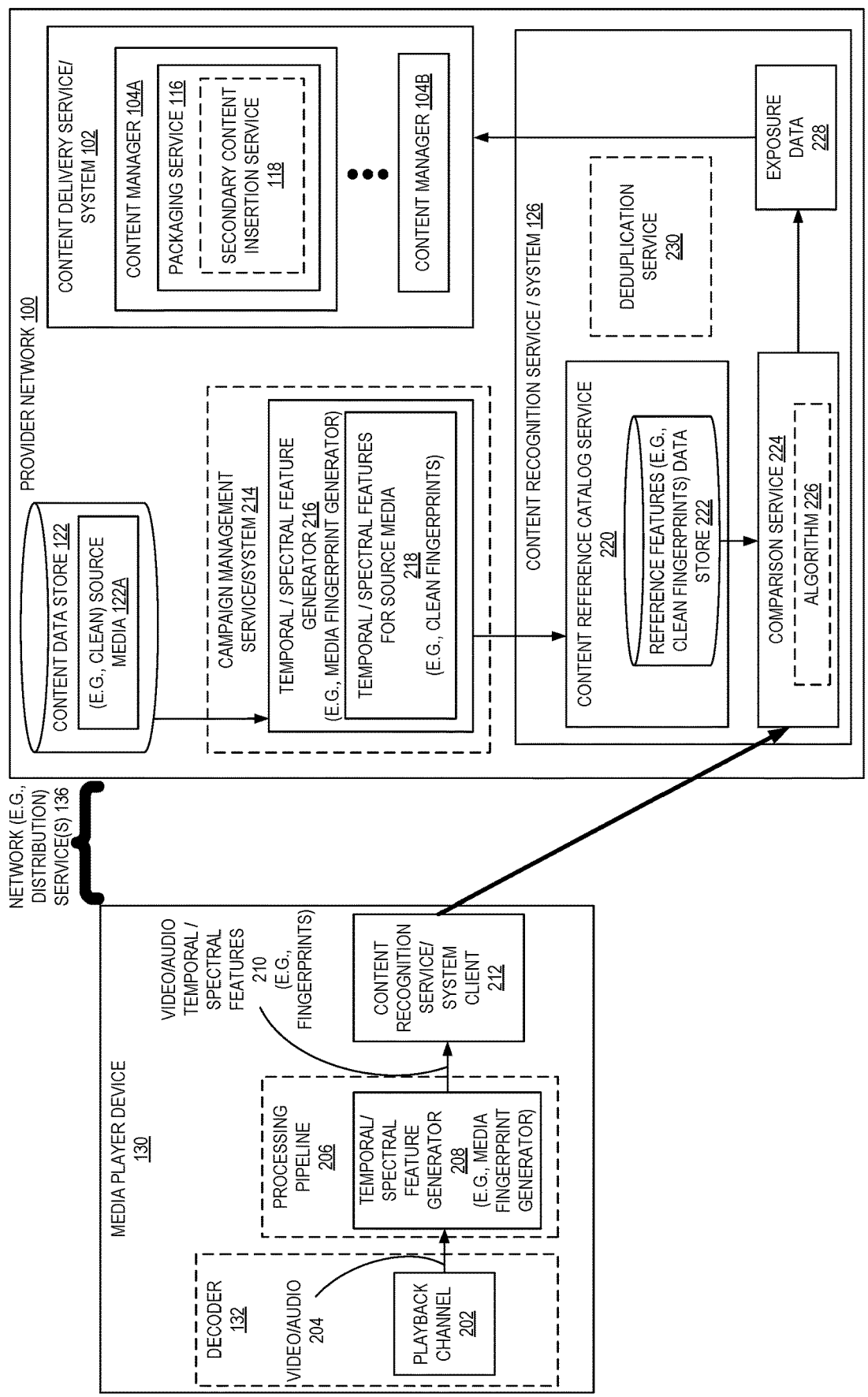
FIG. 2 is a diagram illustrating a media player device that generates temporal/spectral feature(s) (e.g., fingerprint(s)) for media and a comparison service of a provider network to compare the media player device's generated temporal/spectral feature(s) for the media to a set of reference temporal/spectral feature(s) according to some examples.

FIG. 2 is a diagram illustrating a media player device 130 that generates temporal/spectral feature(s) 210 (e.g., fingerprint(s)) for media and a comparison service 224 of a provider network 100 to compare the media player device's generated temporal/spectral feature(s) 210 for the media to a set of reference temporal/spectral feature(s) 222 according to some examples.

In certain examples, media player device 130 includes temporal/spectral feature generator 208 (e.g., fingerprint generator) to generate temporal/spectral feature(s) 210 (e.g., fingerprint(s)) for media from an input of the video/audio 204. In certain examples, the media player device 130 includes a playback channel 202, e.g., of the video/audio 204. In certain examples, decoder 132 generates the video/audio 204, e.g., video for output on display 144 and/or audio for output on audio output 146. In certain examples, media player device 130 includes a processing pipeline 206 including the temporal/spectral feature generator 208 (e.g., fingerprint generator). In certain examples, the temporal/spectral feature(s) 210 (e.g., fingerprint(s)) output from an input of the video/audio 204 is then sent to a comparison service 224 (e.g., of a content recognition service/system 126). In certain examples, media player device 130 includes a content recognition service/system client 212 to communicate with the content recognition service/system 126.

In certain examples, provider network 100 includes a content data store 122 storing a (e.g., clean) (e.g., untransformed) version of source media 122A. In certain examples, provider network 100 (e.g., (e.g., advertisement) campaign management service/system 214) includes a temporal/spectral feature generator 216 (e.g., fingerprint generator) to generate reference temporal/spectral feature(s) 218 (e.g., reference/clean fingerprint(s)) for (e.g., clean) (e.g., untransformed) version of source media 122A. In certain examples, the reference temporal/spectral feature(s) 218 (e.g., reference fingerprint(s)) for (e.g., clean) (e.g., untransformed) version of source media are stored in reference feature (e.g., clean fingerprint) data store 222. In certain examples, a set of temporal/spectral features 218 (e.g., reference fingerprints) for a plurality of corresponding media files is maintained by content reference catalog service 220. For example, where first content (e.g., main content) has a first set of fingerprints and a second content (e.g., secondary content) has a second set of fingerprints.

In certain examples, provider network 100 (e.g., content recognition service/system 126) includes a comparison service 224 to compare an input of candidate temporal/spectral feature(s) (e.g., features 210) (e.g., candidate fingerprint(s)) to reference temporal/spectral feature(s) 222 (e.g., reference fingerprint(s)) to determine if there is a match (e.g., according to algorithm 226). In certain examples, exposure data 228 is generated based on the comparison, e.g., and the exposure data utilized by the provider network 100 (e.g., content delivery service/system 102) to control what content is provided to media player device 130. For example, it may be determined (e.g., by deduplication service 230) that a particular secondary content (e.g., advertisement) has (e.g., exceeding a threshold number of time to show that secondary content to a same device/user) or has not been shown at all, and provider network 100 (e.g., content delivery service/system 102) is to then control what is sent to media player device 130 accordingly.

However, in certain examples, the media player device 130 sends candidate temporal/spectral feature(s) (e.g., features 210) (e.g., candidate fingerprint(s)) to the provider network 100, but the provider network has no other identifying information to determine if any match (or not match indication) is correct for those features. Examples herein are directed to a synthetic temporal/spectral feature generator (e.g., synthetic fingerprint generator) that allows the provider network to, separately from the features (or fingerprint) comparison (e.g., algorithm 226), identify the media file so as to generate accuracy measurement(s) for the performance of the comparison (e.g., algorithm 226). Certain examples utilize the audio/visual output of a media player device (e.g., in contrast to utilizing the media files themselves and/or utilizing a human manually determining a match) to detect certain content (e.g., advertisement) playing on the media player (e.g., user's) device and report them to downstream services. In certain examples, advertisers/marketers can use this information to measure (e.g., advertisement) exposure, tailoring content (e.g., advertisements) played for the user (e.g., so that the user is not bombarded with the same advertisement repeatedly), etc. Certain examples herein are not performed by a human because only the temporal/spectral feature(s) (e.g., fingerprint(s)) are sent to the provider network (e.g., content recognition service/system) (e.g., "cloud") so there is no media file for the human to view and/or listen to on the provider network side.

Figure 3:
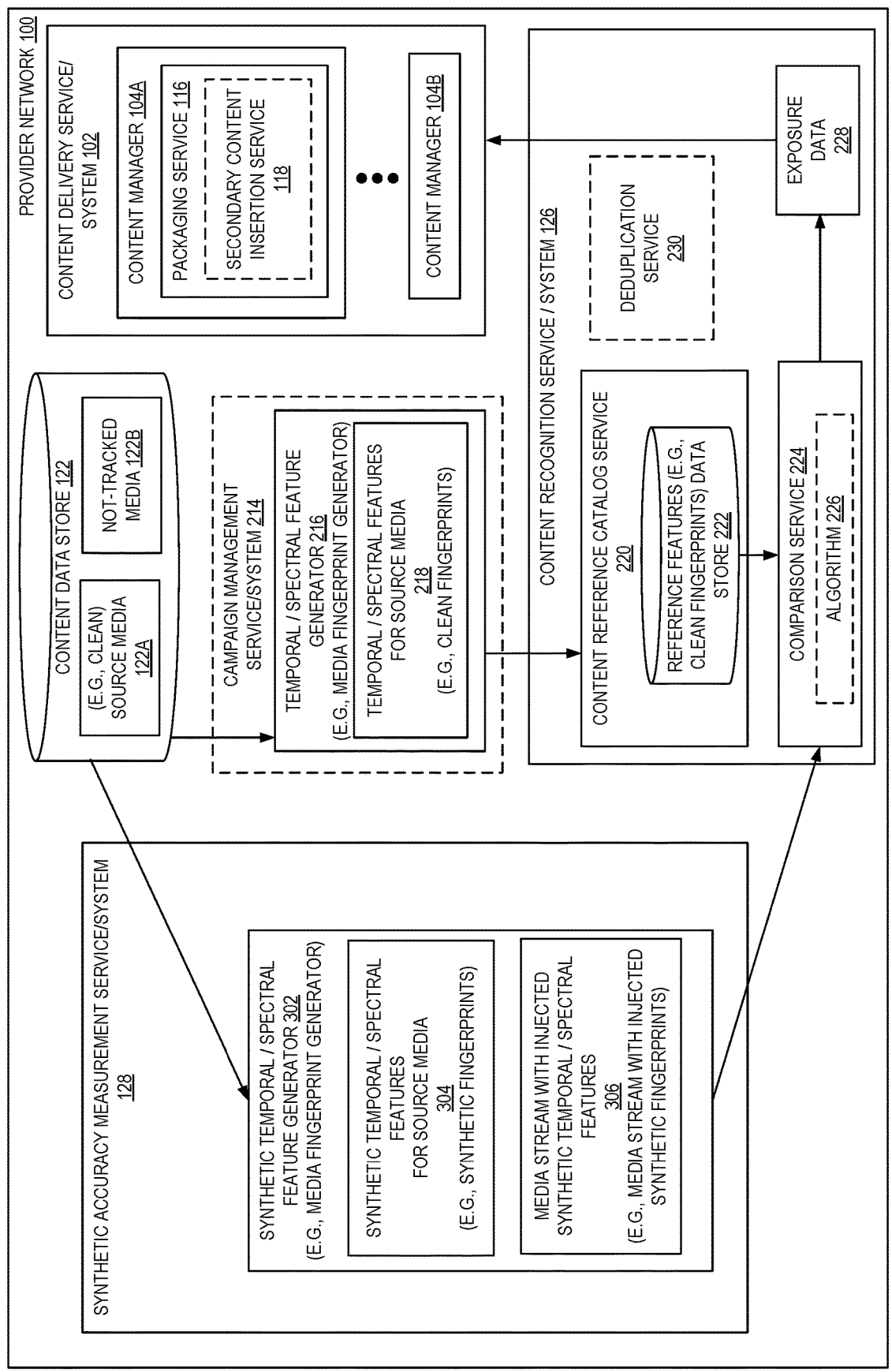
FIG. 3 is a diagram illustrating a provider network that generates synthetic temporal/spectral feature(s) (e.g., synthetic fingerprint(s)) for media and a comparison service of a provider network to compare the provider network's generated synthetic temporal/spectral feature(s) for the media to a set of reference temporal/spectral feature(s) according to some examples.

FIG. 3 is a diagram illustrating a provider network that generates synthetic temporal/spectral feature(s) 304 (e.g., synthetic fingerprint(s)) for media and a comparison service 224 of a provider network to compare the provider network's generated synthetic temporal/spectral feature(s) 304 for the media to a set of reference temporal/spectral feature(s) 222 according to some examples. In certain examples, the (e.g., clean) (e.g., untransformed) version of source media 122A is accessed by the synthetic accuracy measurement service/system 128 (e.g., synthetic temporal/spectral feature generator 302). In certain examples, synthetic temporal/spectral feature generator 302 generates synthetic (e.g., candidate) temporal/spectral feature(s) 304 (e.g., synthetic fingerprint(s)) for the source media 122A.

In certain examples, the synthetic (e.g., candidate) temporal/spectral feature(s) 304 (e.g., synthetic fingerprint(s)) are injected (e.g., inserted) into a stream 306 of other (e.g., also candidate) temporal/spectral feature(s) (e.g., stream of fingerprint(s)). In certain examples, the stream of features 304 (e.g., stream of fingerprints) includes corresponding features (e.g., fingerprints) for multiple different media files (e.g., main content and secondary content).

In certain examples, the stream 306 with injected synthetic (e.g., candidate) temporal/spectral feature(s) 304 (e.g., synthetic fingerprint(s)) is sent to content recognition service/system 126 (e.g., comparison service 224) for a comparison to reference temporal/spectral feature(s) (e.g., reference fingerprints) in data store 222, and an output (e.g., an indication of a match to any of the reference features (e.g., reference fingerprints)) is generated. In certain examples, the output includes exposure data 228.

In certain examples, as the provider network 100 (e.g., content recognition service/system 126) is able to determine, separately from the features (or fingerprint) comparison (for example, the comparison by comparison service 224, e.g., comparison algorithm 226), that the stream 306 includes injected synthetic (e.g., candidate) temporal/spectral feature(s) 304 (e.g., synthetic fingerprint(s)) that have corresponding reference temporal/spectral feature(s) 218 (e.g., reference fingerprints) in data store 222, certain metrics can be generated and/or action(s) can be taken responsively.

Generation of Synthetic Features (e.g., Fingerprints)

In certain examples, synthetic features (e.g., fingerprints) are generated by passing the media (e.g., audio/video) through simulations that are representative of the transformations they go through in the field (e.g., from when they are submitted as clean source for reference feature (e.g., fingerprint) generation until when they are received by the media player device). In certain examples, these simulations are compression, conversion, or (e.g., sophisticated) generative models that take into account the distribution of the distortions that the real video/audio goes through.

In certain examples, content from different sources (e.g., contents that are in a reference data store 222 (e.g., particular ads/shows/movies/etc. that a system is to track, and those that are not in the reference data store 222 (e.g., shows from internal/external sources) are sent through the synthetic temporal/spectral feature generator 302 (e.g., simulation model) to generate the corresponding synthetic content. In certain examples, the synthetic content from these different sources is merged together to generate a stream 306 of data that is representative of the kind of data that a user might be watching or listening to. In certain examples, this stream is periodically refreshed (e.g., as needed) to keep it updated with the reference data store 222 (e.g., as features (e.g., fingerprints) corresponding to new content are added). Along with the data stream 306, in certain examples, metadata (e.g., metadata labels) are generated since the source of the content is known to the provider network 100. In certain examples, the features (e.g., fingerprints) along with the labels obtained can be used to generate a sequence of features (e.g., fingerprints) that are streamed to the content recognition service/system 126 (e.g., and intermixed with the corresponding data from real user devices). In certain examples, the metadata of the synthetic features (e.g., fingerprints) contains a field that allows the content recognition service/system 126 to tell apart synthetic features (e.g., fingerprints) from real features (e.g., real fingerprints) obtained from user devices (e.g., from media player device 130). In certain examples, the type and length of the features (e.g., fingerprints) is set based on the content, e.g., advertisements can have short fingerprints, while TV shows/movies have longer fingerprints.

In certain examples, the provider network 100 (e.g., via content data store 122) is to provide one or more "not-tracked" (e.g., not-tracked by the content recognition service/system 126) media 122B (e.g., video and/or audio), e.g., to determine a false match. In certain examples, this not-tracked media 122B does not have a corresponding set of temporal/spectral feature(s) (e.g., fingerprint(s)) in the reference data store 222. In certain examples, if the temporal/spectral feature(s) (e.g., fingerprint(s)) for not-tracked media 122B (e.g., that fingerprint injected into media stream 306) is not actually for a media file (e.g., ad) in the reference data store 222, but it matches to a "tracked" media file (e.g., corresponding fingerprint 218) in the reference data store 222, this is a false match.

Figure 4:
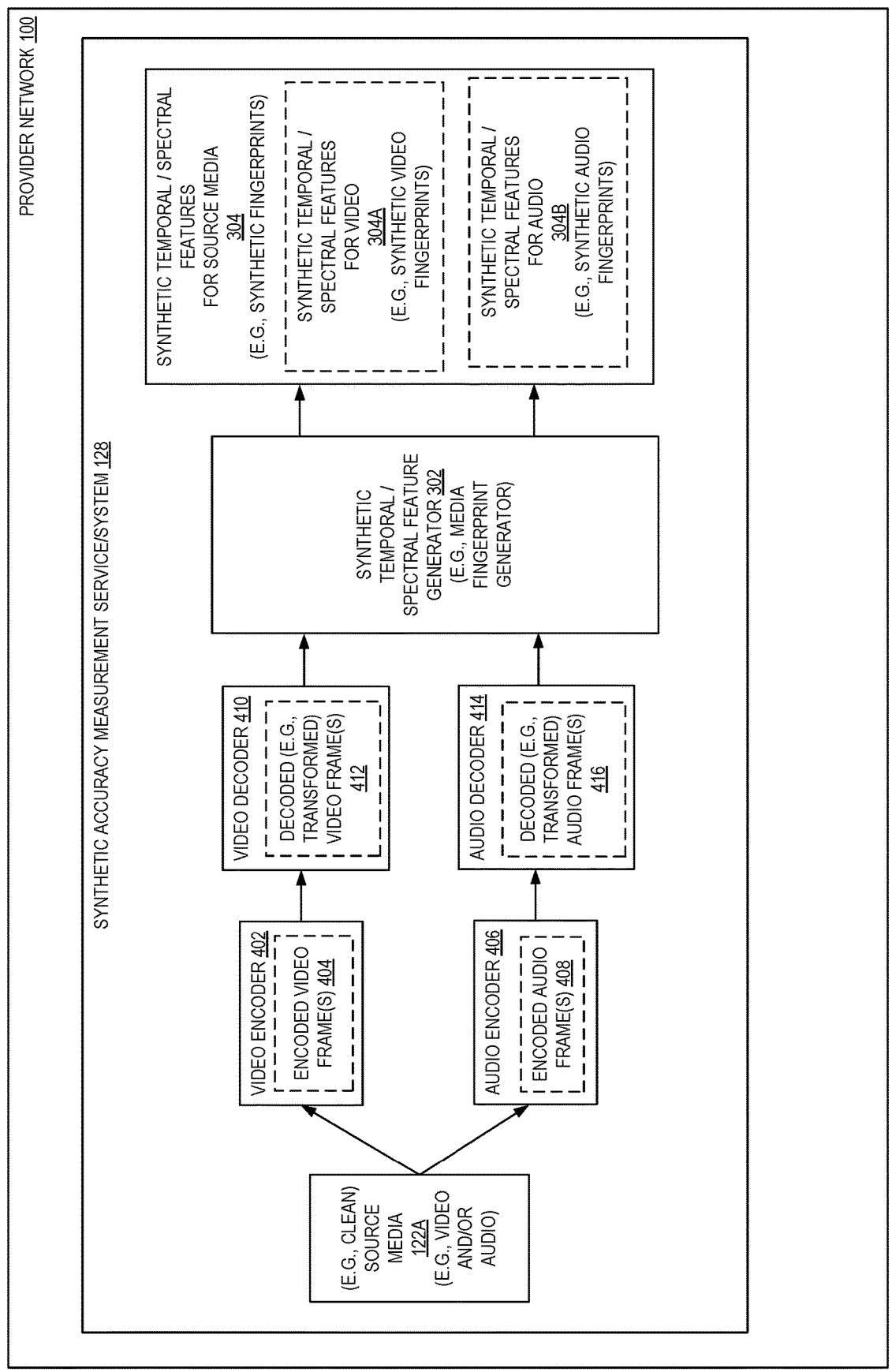
FIG. 4 is a diagram illustrating a synthetic accuracy measurement service/system according to some examples.

FIG. 4 is a diagram illustrating a synthetic accuracy measurement service/system 128 according to some examples. In certain examples, synthetic accuracy measurement service/system 128 includes a (e.g., clean) source media 122A (e.g., video and/or audio), and functionality to transform (or simulate the transform) of that media into a different (e.g., transformed) version, for example, transformed as would happen to a media file as it reaches an end user (e.g., media player device). In certain examples, the synthetic accuracy measurement service/system 128 is to output corresponding features 304 (e.g., fingerprints) based on the different (e.g., transformed) version of the media file 122A.

In certain examples, synthetic accuracy measurement service/system 128 includes, for video, a video encoder 402 to encode the input video into encoded video (e.g., frames) 404, and a video decoder 410 to decode the encoded video (e.g., frames) 404 into decoded (e.g., transformed) video (e.g., frames) 412 (e.g., that are different than the video (e.g., frames) of the source media 122A). In certain examples, a synthetic temporal/spectral feature generator 302 (e.g., media fingerprint generator) then generates a set of corresponding video features 304A (e.g., fingerprints) for the decoded (e.g., transformed) video (e.g., frames) 412. For example, with this occurring entirely in the provider network, e.g., without requiring the use and/or purchase of actual media player device(s) to generate the video features (e.g., video fingerprints).

In certain examples, synthetic accuracy measurement service/system 128 includes, for audio, an audio encoder 406 to encode the input audio into encoded audio (e.g., frames) 408, and an audio decoder 414 to decode the encoded audio (e.g., frames) 408 into decoded (e.g., transformed) audio (e.g., frames) 416 (e.g., that are different than the audio (e.g., frames) of the source media 122A). In certain examples, a synthetic temporal/spectral feature generator 302 (e.g., media fingerprint generator) then generates a set of corresponding audio features 304B (e.g., fingerprints) for the decoded (e.g., transformed) video (e.g., frames) 412. For example, with this occurring entirely in the provider network, e.g., without requiring the use and/or purchase of actual media player device(s) to generate the audio features (e.g., audio fingerprints).

Figure 5:
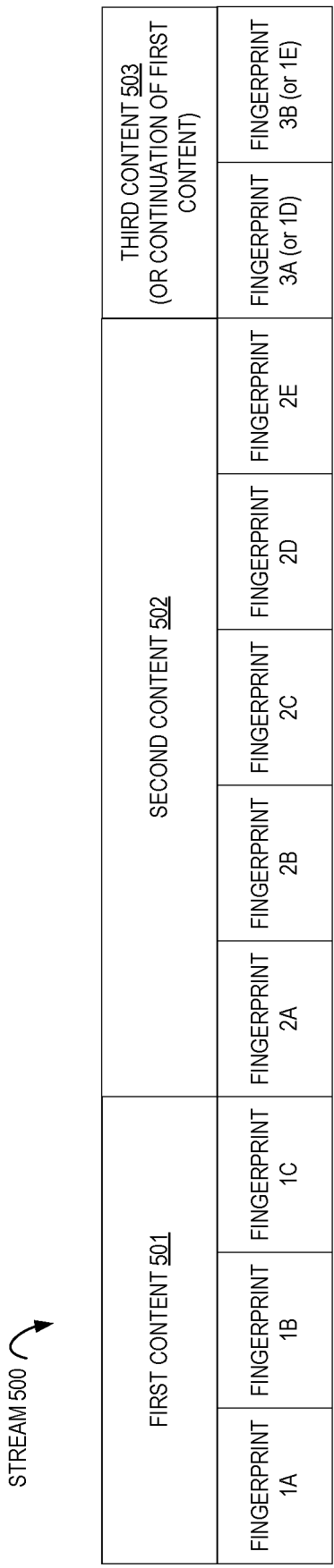
FIG. 5 is a diagram illustrating a stream of media having a plurality of content and corresponding fingerprints according to some examples.

FIG. 5 is a diagram illustrating a stream 500 of media having a plurality of content and corresponding fingerprints according to some examples. In certain examples, stream 500 includes first content 501 (e.g., and a set of corresponding fingerprints 1A-1C), second content 502 (e.g., and a set of corresponding fingerprints 2A-2E), and a third content 503 (e.g., and a set of corresponding fingerprints 3A-3B) (or continuation of the first content 501 and a set of corresponding fingerprints 1D-1E). In certain examples, one or more of the fingerprints is generated by synthetic temporal/spectral feature generator (e.g., media fingerprint generator). In certain examples, the content itself is not provided to a provider network, e.g., only the fingerprints themselves are sent to the provider network (e.g., content recognition service/system 126 thereof).

Matching

In certain examples, a plurality of (e.g., about 4 second long) synthetic features (e.g., fingerprints) are generated from the transformed version of a media file to simulate (e.g., non-synthetic) on-device features (e.g., on-device fingerprints). In certain examples, each synthetic feature (e.g., fingerprint) generated from the same media (e.g., advertisement) is assigned the same device serial number (DSN) to simulate a particular media player (e.g., user) watching and/or listening to that media (e.g., advertisement). In certain examples, test features (e.g., fingerprints) from a given media (e.g., advertisement) are generated successively and streamed to the provider network (e.g., cloud) in a serial fashion, e.g., like is done for actual media player device (e.g., user) generated features (e.g., fingerprints). In certain examples, for the synthetic features (e.g., fingerprints), a field in its metadata (e.g., label=reference universally unique ID (UUID) from which it is generated) is set to indicate it is a synthetically generated (e.g., and not media player device) feature (e.g., fingerprint), e.g., to allow the provider network (e.g., cloud) to identify that the particular feature (e.g., fingerprint) is a test feature (e.g., fingerprint) and not a user (e.g., customer) sourced feature (e.g., fingerprint).

In certain examples, aggregation and/or exposure calculations for these synthetic features (e.g., fingerprints) would be identical to that real customer features (e.g., fingerprints). Thus, in certain examples, the provider network 100 (e.g., content recognition service/system 126) can measure the metrics both at a feature (e.g., fingerprint) level and a (e.g., entire) media file level.

In certain examples, the provider network 100 (e.g., content recognition service/system 126) includes comparison (e.g., matching) service 224 (e.g., outputs the matching media (e.g., advertisement) for a single synthetic feature (e.g., fingerprint). In certain examples, comparison (e.g., matching) service 224 includes an aggregation service that takes the output of the comparison and aggregates match results across features (e.g., fingerprints) (e.g., features from the same DSN) to declare media (e.g., advertisement) level exposures.

In certain examples, the provider network 100 (e.g., content recognition service/system 126) includes deduplication service 230, e.g., to distinguish between multiple media that are partially overlapping (e.g., 15 s and 30 s versions of the same media (e.g., ad) and/or localized ads like Car Dealer X of Boston vs. Car Dealer X of San Diego).

In certain examples, the feature (e.g., fingerprint) level metrics allow the measurement of the performance of the matching algorithm and/or the media file level metrics allow the measurement of the combined performance of the comparison service 224 (e.g., matching algorithm 226 and/or aggregation service) and/or deduplication service 230.

Results

In certain examples, synthetic features (e.g., fingerprints) are used to benchmark the performance of the comparison algorithm. In certain examples, synthetic features (e.g., fingerprints) are used to monitor the performance (e.g., "health") of the provider network 100, e.g., the content recognition service/system 126. In certain examples, synthetic features (e.g., fingerprints) are generated by the provider network 100, e.g., as opposed to real features (e.g., fingerprints) that are generated by user device(s). In certain examples (e.g., for each secondary content (e.g., advertisement) in the reference data store 222, the provider network 100 (e.g., synthetic accuracy measurement service/system 128) transforms the content by passing it through a compression and/or conversion (e.g., offline) to obtain the transformed version, e.g., and the synthetic temporal/spectral feature generator 302 generates the synthetic (e.g., candidate) temporal/spectral feature(s) 304 (e.g., synthetic fingerprint(s)) from the transformed version (e.g., instead of the clean version). In certain examples, the compression/conversion includes: converting the media to a lossy file format (e.g., MP3) and convert it back to another (e.g., WAV) format, or compress using compression settings and convert it back to another (e.g., WAV) format.

In certain examples, the synthetic (e.g., modeling of on-device) features 304 (e.g., fingerprints) will be generated from the transformed content and injected into the system (e.g., stream 306) for matching. In certain examples, from these synthetic features (e.g., fingerprints), the provider network 100 (e.g., content recognition service/system 126) determines one or any combination of: true match rate (e.g., $TMR_{ad}$), false match rate (e.g., $FMR_{ad}$), or false reject rate (e.g., $FRR_{ad}$) of content (e.g., advertisements) in the data store (e.g., data store 222). In certain examples, one or more of the match rates indicates how well the content recognition service/system 126 is performing (e.g., on the marketer reference database, e.g., denoted by using the "ad" subscript). In certain examples, the provider network 100 generate (e.g., modeling of on-device) features (e.g., fingerprints) from a separate set of secondary content and/or main content (e.g., movies and/or TV shows) that will not be in the reference data store 222. In certain examples, these features (e.g., fingerprints) from content not in the reference data store 222 are used to measure a false match rate (e.g., $FMR_{nonad}$) and true reject rate (e.g., $TRR_{nonad}$) of content not in the reference data store 222 (e.g., not ads, indicated as subscript nonad). IN certain examples, these match rates serve as proxy for how well the content recognition service/system 126 is performing on that content (e.g., non-ad data like TV shows and other ads that the system is not interested in tracking. In certain examples, provider network 100 (e.g., synthetic accuracy measurement service/system 128) injects these test features (e.g., fingerprints) (e.g., "ad" and/or "nonad") (e.g., at a fixed cadence) into a cloud-matching service (e.g., comparison service 224) (e.g., along with real customer data) and track these metrics to measure the performance of the comparison (e.g., algorithm 226).

In certain examples, the synthetic benchmarking is run multiple times a day everyday (or every few days) to test the algorithm in various (e.g., transactions per second (TPS)) conditions (for example, where various times have different viewing patterns, e.g., more viewers in the evening versus morning, etc.).

In certain examples, fingerprint level metrics (e.g., for particular stream) include one or any combination of: true match rate (TMR)=the number of synthetic fingerprints from the reference data store that matched to the correct media file (e.g., ad)) divided by the total number of fingerprints from the reference data store (e.g., database), false match rate (e.g., $FMR_{ad}$)=the number of synthetic fingerprints from the reference data store that matched to an incorrect media file (e.g., ad) divided by the total number of fingerprints from the reference data store, false reject rate (e.g., FRR)=the number of synthetic fingerprints from the reference data store that do not match to any media file (e.g., ad) divided by the total number of fingerprints from the reference data store, false match rate (e.g., $FMR_{nonad}$)=the number of synthetic fingerprints not from the reference data store that matched to a media file (e.g., ad) divided by the total number of fingerprints not from the reference data store, and/or true reject rate (e.g., TRR)=the number of synthetic fingerprints not from the reference data store that do not match to any media file (e.g., ad) divided by the total number of fingerprints not from the reference data store.

In certain examples, media (e.g., ad) file level metrics include accuracy=the number of times the correct reference media file (e.g., ad) was outputted as an exposure divided by the number of times the synthetic ad was streamed into the provider network 100 (e.g., the cloud matching system).

Result Validation

In certain examples, the content recognition service/system 126 outputs the result of the matching for only synthetic features (e.g., fingerprints) by reading the additional metadata field. In certain examples, the validation logic may change based on the content type, e.g., validation for short content (e.g., advertisements) can be different from longer content (e.g., shows or movies). In certain examples, the output is then received by a result validator in the benchmarking system (e.g., of content recognition service/system 126).

Result Publishing/Storage

In certain examples, a result validator compares the expected content output to the resulted content output to calculate performance metrics of the system (e.g., content recognition service/system 126). In certain examples, these metrics (e.g., exposure data 228) may be directly published to a dashboard (e.g., a graphical user interface (GUI), e.g., in a continuous online manner. In certain examples, alarms may be set and/or triggers based on metrics (e.g., missed match rates, false match rates, etc.) to alert when the system performance is deviating from the expected performance. In certain examples, the metrics may be stored along with the synthetic features (e.g., fingerprints) in an offline storage system allowing further analysis at a later time. In certain examples, the performance metrics are segregated across multiple dimensions (e.g., per user, content, region, device type, time of the day, etc.).

In certain examples, exposure data 228 is stored in a data store of provider network 100 for each fingerprint (e.g., both synthetic and customer (e.g., real) fingerprints).

FIG. 6 is an example format of exposure data 228 according to some examples.

Example Requirements

In certain examples, the provider network 100 (for example, system, e.g., synthetic accuracy measurement service/system 128) generates feature (e.g., fingerprint) chunks from a given test media file (e.g., ad) in the same manner that on-device features (e.g., fingerprints) are generated. In certain examples, the provider network 100 (for example, system, e.g., synthetic accuracy measurement service/system 128) injects synthetic data (e.g., 304) along with customer data into the cloud for matching. In certain examples, the provider network 100 (for example, system, e.g., synthetic accuracy measurement service/system 128) writes the match results to a service for offline analysis (see below for a discussion of example sections for metrics/fields to be stored for offline analysis). In certain examples, the provider network 100 calculates the metrics online and/or writes (e.g., stores) the metrics to a dashboard.

In certain examples, synthetic benchmarking and/or metric calculation to happen in real time and write the results to a dashboard. In certain examples, the test fingerprints have a unique identifier (e.g., field in the metadata) that indicate the fingerprint is a synthetic fingerprint.

In certain examples, if the fingerprint is from a media file (e.g., ad) in the reference data store, the unique stream ID (e.g., ad) would also have the matching a media file (e.g., ad) ID.

In certain examples, if the fingerprint matches to that exact a media file (e.g., ad), it would be counted as a true match. In certain examples, if the fingerprint matches to another media file (e.g., ad), it would be counted as a false match. In certain examples, if the fingerprint does not match to any media file (e.g., ad), it would be counted as a false reject. In certain examples, if the fingerprint is not actually from a media files (e.g., ads) in the reference data store, and it matches to a media file (e.g., ad) in the data store, it would be counted as a false match and if the fingerprint does not match to any media file (e.g., ad), it would be counted as a true reject.

In certain examples, for each iteration of testing, counters are initialized for each of these match types to generate match rates (e.g., once the testing is complete). In certain examples, the match rates are published to a dashboard directly. In certain examples, this is also done for measuring media file (e.g., ad) level exposure accuracy. In certain examples, for each iteration of testing, it is known exactly how many times a fingerprint for a media file (e.g., ad) has been injected, e.g., and that is used to compute the exposure accuracy online and/or publish it to a dashboard.

Figure 7:
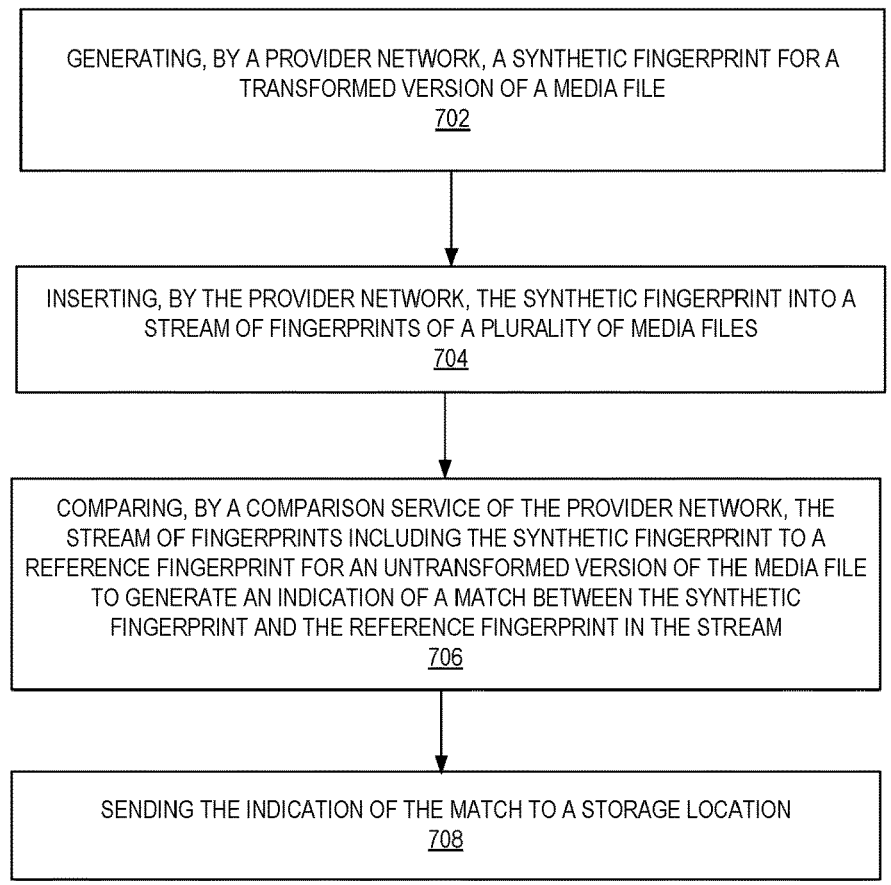
FIG. 7 is a flow diagram illustrating operations of a method of generating and using synthetic fingerprints for a media file according to some examples.

FIG. 7 is a flow diagram illustrating operations 700 of a method of generating and using synthetic fingerprints for a media file according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by a provider network 100 (e.g., synthetic accuracy measurement service/system 128 implemented in a provider network) of the other figures.

The operations 700 include, at block 702, generating, by a provider network, a synthetic fingerprint for a transformed version of a media file. The operations 700 further include, at block 704, inserting, by the provider network, the synthetic fingerprint into a stream of fingerprints of a plurality of media files. The operations 700 further include, at block 706, comparing, by a comparison service of the provider network, the stream of fingerprints including the synthetic fingerprint to a reference fingerprint for an untransformed version of the media file to generate an indication of a match between the synthetic fingerprint and the reference fingerprint in the stream. The operations 700 further include, at block 708, sending the indication of the match to a storage location.

Exemplary environments, systems, etc. that the above may be used in are detailed below.

At least some examples of the disclosed technologies can be described in view of the following examples:

Example 1. A computer-implemented method comprising:
generating, by a provider network, a reference fingerprint for a secondary content (e.g., advertisement) media (e.g., video) file;
generating, by the provider network, a synthetic fingerprint for a transformed version of the secondary content media file;
inserting, by the provider network, the synthetic fingerprint into a stream of fingerprints of a plurality of media files;
comparing, by a comparison service of the provider network, the stream of fingerprints including the synthetic fingerprint to the reference fingerprint to generate an indication of a match between the synthetic fingerprint and the reference fingerprint in the stream; and
sending the indication of the match to a storage location.

Example 2. The computer-implemented method of example 1, wherein the indication is at a fingerprint level and a media file level.

Example 3. The computer-implemented method of example 1, further comprising:
performing an encode of the secondary content media file, used to generate the reference fingerprint, to generate an encoded secondary content media file; and
decoding the encoded secondary content media file to generate the transformed version of the secondary content media file.

Example 4. A computer-implemented method comprising:
generating, by a provider network, a synthetic fingerprint for a transformed version of a media file;
inserting, by the provider network, the synthetic fingerprint into a stream of fingerprints of a plurality of media files;
comparing, by a comparison service of the provider network, the stream of fingerprints including the synthetic fingerprint to a reference fingerprint for an untransformed version of the media file to generate an indication of a match between the synthetic fingerprint and the reference fingerprint in the stream; and
sending the indication of the match to a storage location.

Example 5. The computer-implemented method of example 4, wherein the indication is at a fingerprint level and a media file level.

Example 6. The computer-implemented method of example 4, further comprising:
performing an encode of the untransformed version of the media file to generate an encoded media file; and
decoding the encoded media file to generate the transformed version of the media file.

Example 7. The computer-implemented method of example 4, further comprising generating the transformed version of the media file by simulating (e.g., without actually performing the transform) a transformation that the untransformed version of the media file is to experience from when the media file is submitted as a source for reference fingerprint generation until the media file is received from the provider network by a user device.

Example 8. The computer-implemented method of example 4, further comprising converting the untransformed version of the media file in a first format to a second format to generate the transformed version of the media file.

Example 9. The computer-implemented method of example 4, further comprising:
generating, by the provider network, a second synthetic fingerprint for a transformed version of a second media file;
inserting, by the provider network, the second synthetic fingerprint into the stream of fingerprints of the plurality of media files;
comparing, by the comparison service of the provider network, the stream of fingerprints including the second synthetic fingerprint to a second reference fingerprint for an untransformed version of the second media file to generate a second indication of a second match between the second synthetic fingerprint and the second reference fingerprint in the stream; and
sending the second indication of the second match to the storage location.

Example 10. The computer-implemented method of example 4, further comprising generating, by the provider network, a metadata label of the synthetic fingerprint that indicates the synthetic fingerprint was generated by the provider network (e.g., and not from any user device).

Example 11. The computer-implemented method of example 10, wherein the generation of the indication of the match between the synthetic fingerprint and the reference fingerprint in the stream is not based on the metadata label.

Example 12. The computer-implemented method of example 4, wherein the synthetic fingerprint comprises an audio fingerprint.

Example 13. The computer-implemented method of example 4, further comprising generating, by the provider network, a true match rate and a false match rate for the media file in the stream based at least in part on the indication.

Example 14. The computer-implemented method of example 4, further comprising modifying a matching algorithm of a content recognition service based at least in part on the indication.

Example 15. A system comprising:
a content data store to store a reference fingerprint for an untransformed version of a media file; and
one or more electronic devices to implement a computing service, the computing service including instructions that upon execution cause the computing service to perform operations comprising:
generating a synthetic fingerprint for a transformed version of the media file,
inserting the synthetic fingerprint into a stream of fingerprints of a plurality of media files,
comparing the stream of fingerprints including the synthetic fingerprint to the reference fingerprint for the untransformed version of the media file to generate an indication of a match between the synthetic fingerprint and the reference fingerprint in the stream, and sending the indication of the match to a storage location.

Example 16. The system of example 15, wherein the indication is at a fingerprint level and a media file level.

Example 17. The system of example 15, wherein the instructions upon execution cause the computing service to perform operations further comprising:

performing an encode of the untransformed version of the media file to generate an encoded media file; and decoding the encoded media file to generate the transformed version of the media file.

Example 18. The system of example 15, wherein the instructions upon execution cause the computing service to perform operations further comprising generating a metadata label of the synthetic fingerprint that indicates the synthetic fingerprint was generated by the computing service, wherein the generation of the indication of the match between the synthetic fingerprint and the reference fingerprint in the stream is not based on the metadata label.

Example 19. The system of example 15, wherein the instructions upon execution cause the computing service to perform operations further comprising generating a true match rate and a false match rate for the media file in the stream based at least in part on the indication.

Example 20. The system of example 15, wherein the instructions upon execution cause the computing service to perform operations further comprising modifying a matching algorithm of a content recognition service based at least in part on the indication.

Figure 8:
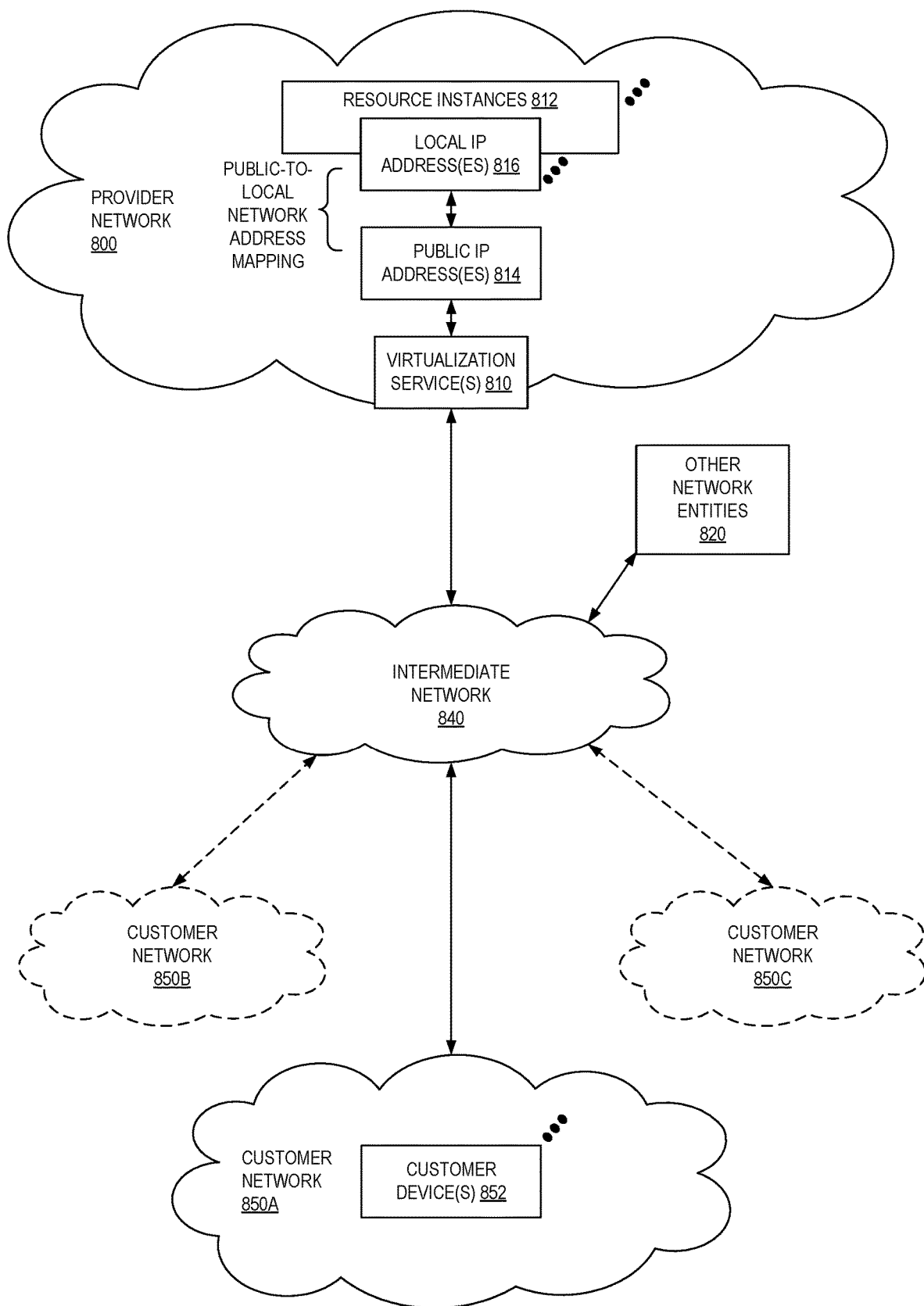
FIG. 8 illustrates an example provider network environment according to some examples.

FIG. 8 illustrates an example provider network (or "service provider system") environment according to some examples. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some examples, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
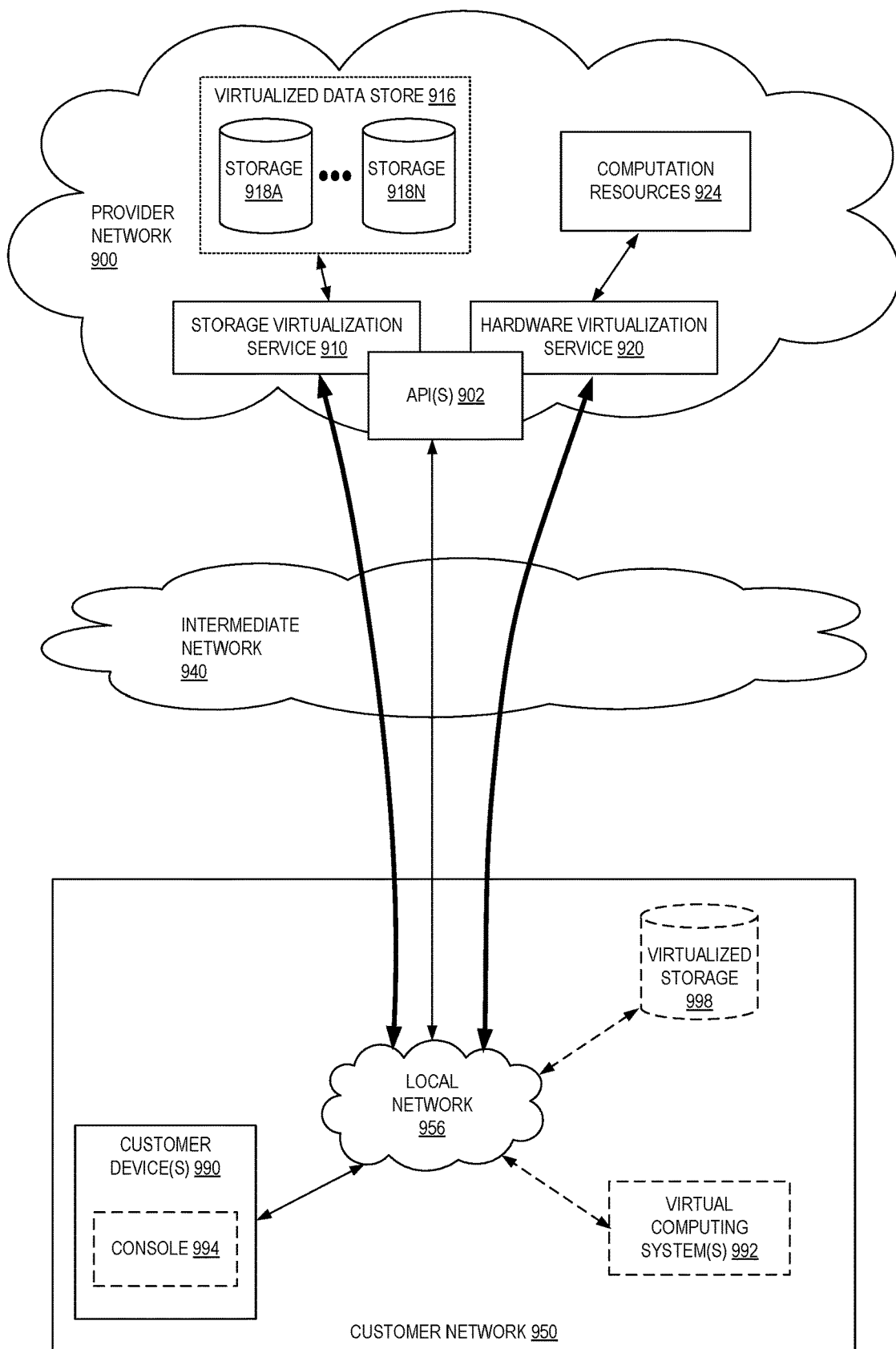
FIG. 9 is a block diagram of an example provider network that provides a storage service and a hardware virtualization service to customers according to some examples.

FIG. 9 is a block diagram of an example provider network that provides a storage service and a hardware virtualization service to customers, according to some examples. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some examples, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some examples, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some examples, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some examples, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
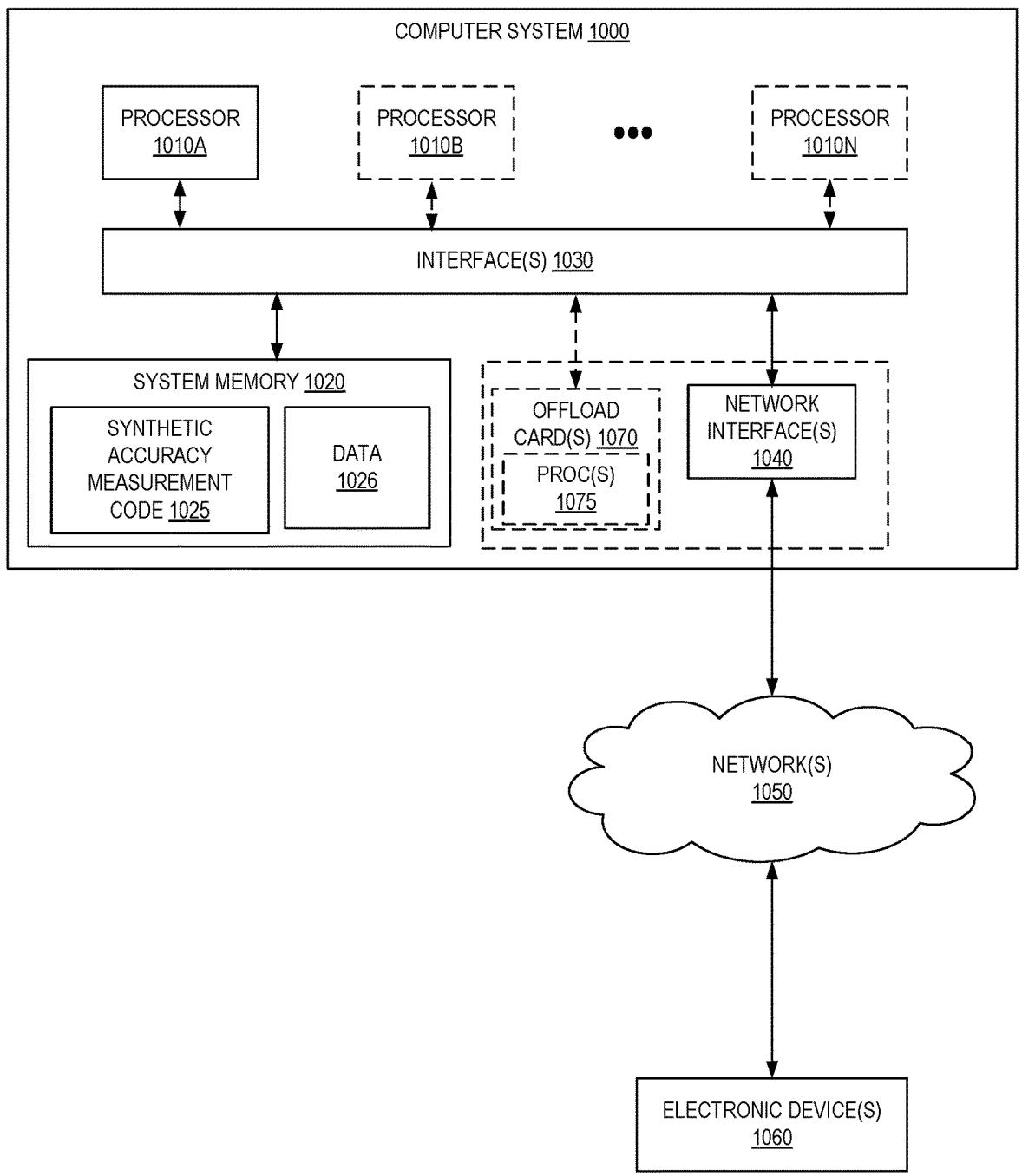
FIG. 10 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1000 illustrated in FIG. 10. In the illustrated example, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various examples a computer system 1000 may include one computing device or any number of computing devices configured to work together as a single computer system 1000.

In various examples, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various examples, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various examples, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1020 as synthetic accuracy measurement code 1025 (e.g., executable to implement, in whole or in part, the synthetic accuracy measurement service 128 or other operations discussed herein) and data 1026.

In one example, I/O interface 1030 may be configured to coordinate I/O traffic between processor 1010, system memory 1020, and any peripheral devices in the device, including network interface 1040 or other peripheral interfaces. In some examples, I/O interface 1030 may perform any necessary protocol, timing, or other data transformations to convert data signals from one component (e.g., system memory 1020) into a format suitable for use by another component (e.g., processor 1010). In some examples, I/O interface 1030 may include support for devices attached through various types of peripheral buses, such as a variant of the Peripheral Component Interconnect (PCI) bus standard or the Universal Serial Bus (USB) standard, for example. In some examples, the function of I/O interface 1030 may be split into two or more separate components, such as a north bridge and a south bridge, for example. Also, in some examples some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various examples, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some examples the offload card(s) 1070 can perform compute instance management operations such as pausing and/or un-pausing compute instances, launching and/or terminating compute instances, performing memory transfer/copying operations, etc. These management operations may, in some examples, be performed by the offload card(s) 1070 in coordination with a hypervisor (e.g., upon a request from a hypervisor) that is executed by the other processors 1010A-1010N of the computer system 1000. However, in some examples the virtualization manager implemented by the offload card(s) 1070 can accommodate requests from other entities (e.g., from compute instances themselves), and may not coordinate with (or service) any separate hypervisor.

In some examples, system memory 1020 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Figure 11:
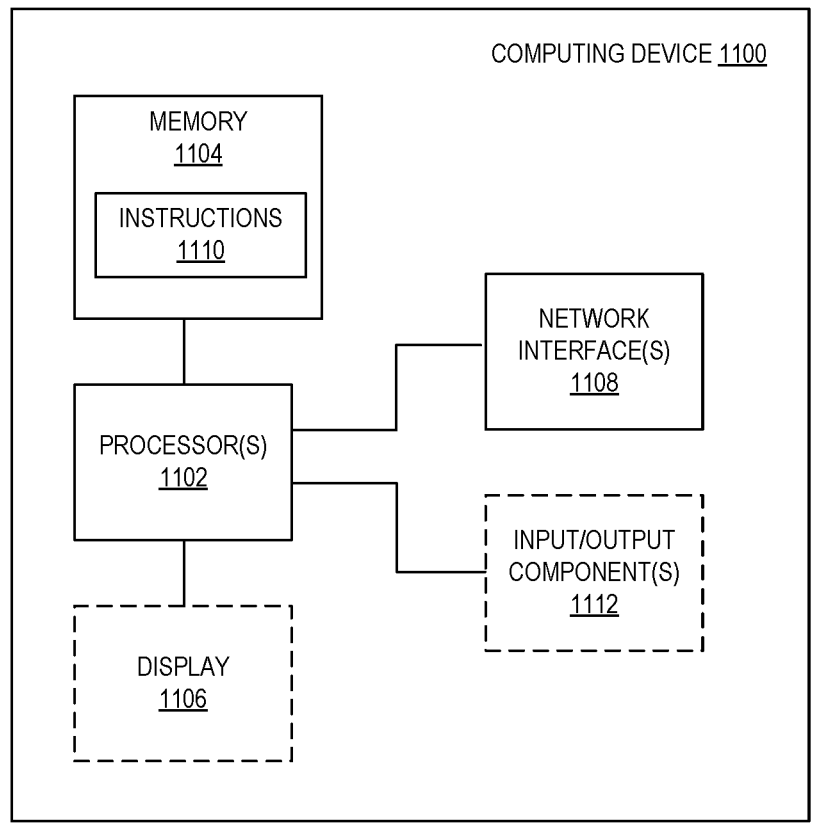
FIG. 11 illustrates a logical arrangement of a set of general components of an exemplary computing device that can be utilized in accordance with various examples.

FIG. 11 illustrates a logical arrangement of a set of general components of an example computing device 1100. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (for example, instructions 1110, e.g., which implement a content delivery service as disclosed herein), and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1110) for execution on the set of one or more processors 1102 of that electronic device. One or more parts of various examples may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some examples include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 12:
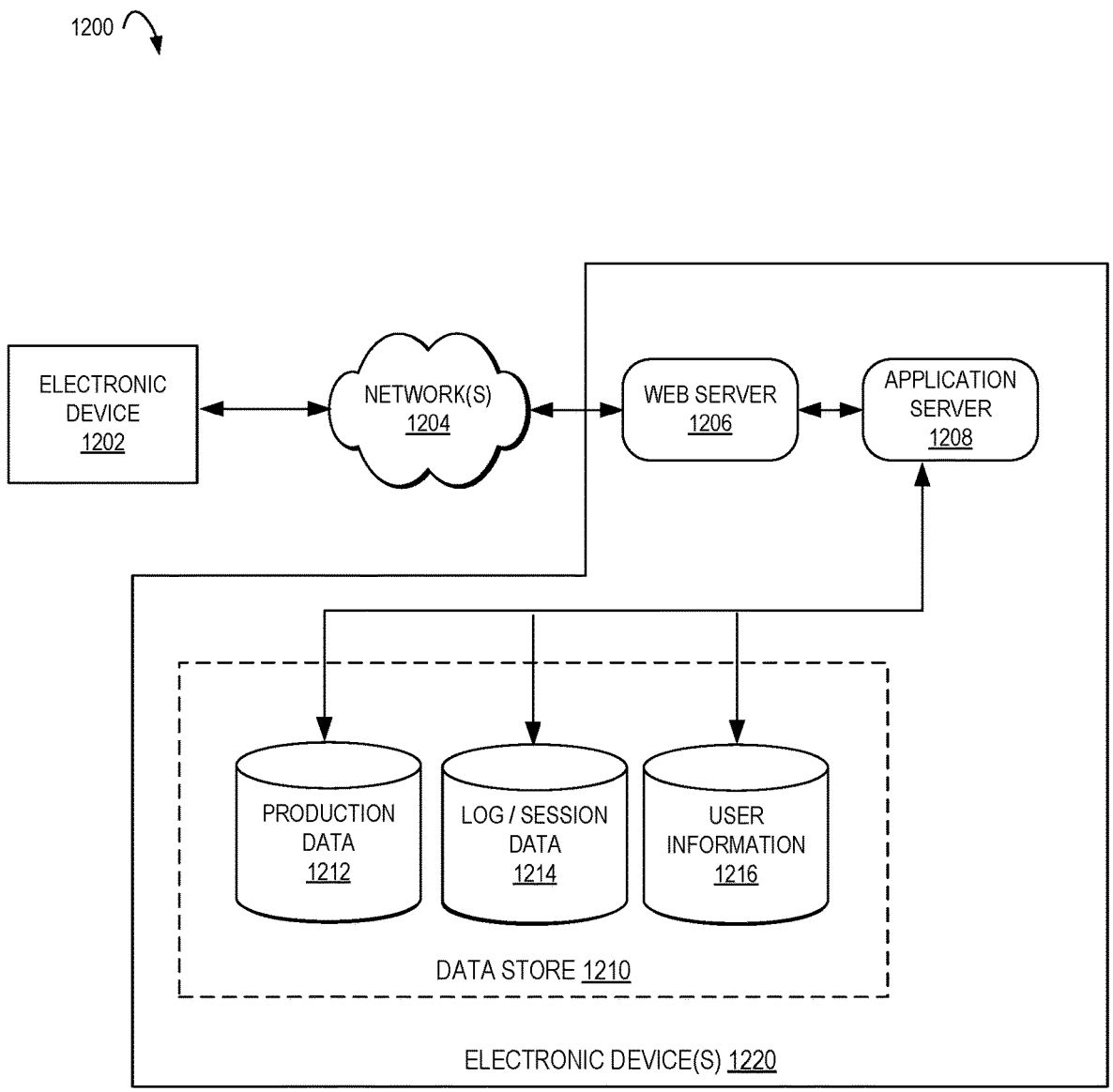
FIG. 12 illustrates an example of an environment for implementing aspects in accordance with various examples.

As discussed, different approaches can be implemented in various environments in accordance with the described examples. For example, FIG. 12 illustrates an example of an environment 1200 for implementing aspects in accordance with various examples. For example, in some examples messages are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various examples. The system includes an electronic client device 1202, which may also be referred to as a client device and can be any appropriate device operable to send and receive requests, messages, or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations, and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 918A-918N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    generating, by a provider network, a reference fingerprint for a secondary content media file;
    generating, by the provider network, a synthetic fingerprint for a transformed version of the secondary content media file;
    inserting, by the provider network, the synthetic fingerprint into a stream of fingerprints of a plurality of media files;
    comparing, by a comparison service of the provider network, the stream of fingerprints including the synthetic fingerprint to the reference fingerprint to generate an indication of a match between the synthetic fingerprint and the reference fingerprint in the stream; and sending the indication of the match to a storage location.

2. The computer-implemented method of claim 1, wherein the indication is at a fingerprint level and a media file level.

3. The computer-implemented method of claim 1, further comprising:

performing an encode of the secondary content media file, used to generate the reference fingerprint, to generate an encoded secondary content media file; and decoding the encoded secondary content media file to generate the transformed version of the secondary content media file.

4. A computer-implemented method comprising:

generating, by a provider network, a synthetic fingerprint for a transformed version of a media file;

inserting, by the provider network, the synthetic fingerprint into a stream of fingerprints of a plurality of media files;

comparing, by a comparison service of the provider network, the stream of fingerprints including the synthetic fingerprint to a reference fingerprint for an untransformed version of the media file to generate an indication of a match between the synthetic fingerprint and the reference fingerprint in the stream; and sending the indication of the match to a storage location.

5. The computer-implemented method of claim 4, wherein the indication is at a fingerprint level and a media file level.

6. The computer-implemented method of claim 4, further comprising:

performing an encode of the untransformed version of the media file to generate an encoded media file; and decoding the encoded media file to generate the transformed version of the media file.

7. The computer-implemented method of claim 4, further comprising generating the transformed version of the media file by simulating a transformation that the untransformed version of the media file is to experience from when the media file is submitted as a source for reference fingerprint generation until the media file is received from the provider network by a user device.

8. The computer-implemented method of claim 4, further comprising converting the untransformed version of the media file in a first format to a second format to generate the transformed version of the media file.

9. The computer-implemented method of claim 4, further comprising:

generating, by the provider network, a second synthetic fingerprint for a transformed version of a second media file;

inserting, by the provider network, the second synthetic fingerprint into the stream of fingerprints of the plurality of media files;

comparing, by the comparison service of the provider network, the stream of fingerprints including the second synthetic fingerprint to a second reference fingerprint for an untransformed version of the second media file to generate a second indication of a second match between the second synthetic fingerprint and the second reference fingerprint in the stream; and sending the second indication of the second match to the storage location.

10. The computer-implemented method of claim 4, further comprising generating, by the provider network, a metadata label of the synthetic fingerprint that indicates the synthetic fingerprint was generated by the provider network.

11. The computer-implemented method of claim 10, wherein the generation of the indication of the match between the synthetic fingerprint and the reference fingerprint in the stream is not based on the metadata label.

12. The computer-implemented method of claim 4, wherein the synthetic fingerprint comprises an audio fingerprint.

13. The computer-implemented method of claim 4, further comprising generating, by the provider network, a true match rate and a false match rate for the media file in the stream based at least in part on the indication.

14. The computer-implemented method of claim 4, further comprising modifying a matching algorithm of a content recognition service based at least in part on the indication.

15. A system comprising:

a content data store to store a reference fingerprint for an untransformed version of a media file; and one or more electronic devices to implement a computing service, the computing service including instructions that upon execution cause the computing service to perform operations comprising:

generating a synthetic fingerprint for a transformed version of the media file, inserting the synthetic fingerprint into a stream of fingerprints of a plurality of media files, comparing the stream of fingerprints including the synthetic fingerprint to the reference fingerprint for the untransformed version of the media file to generate an indication of a match between the synthetic fingerprint and the reference fingerprint in the stream, and sending the indication of the match to a storage location.

16. The system of claim 15, wherein the indication is at a fingerprint level and a media file level.

17. The system of claim 15, wherein the instructions upon execution cause the computing service to perform operations further comprising:

performing an encode of the untransformed version of the media file to generate an encoded media file; and decoding the encoded media file to generate the transformed version of the media file.

18. The system of claim 15, wherein the instructions upon execution cause the computing service to perform operations further comprising generating a metadata label of the synthetic fingerprint that indicates the synthetic fingerprint was generated by the computing service, wherein the generation of the indication of the match between the synthetic fingerprint and the reference fingerprint in the stream is not based on the metadata label.

19. The system of claim 15, wherein the instructions upon execution cause the computing service to perform operations further comprising generating a true match rate and a false match rate for the media file in the stream based at least in part on the indication.

20. The system of claim 15, wherein the instructions upon execution cause the computing service to perform operations further comprising modifying a matching algorithm of a content recognition service based at least in part on the indication.

* * * * *